(12) United States Patent
Kupiec et al.

(10) Patent No.: US 7,194,529 B2
(45) Date of Patent: Mar. 20, 2007

(54) METHOD AND APPARATUS FOR THE DELIVERY AND INTEGRATION OF AN ASSET MANAGEMENT SYSTEM INTO AN EXISTING ENTERPRISE NETWORK

(75) Inventors: Ronald A. Kupiec, Chagrin Falls, OH (US); Paolo Argentieri, Richmond Heights, OH (US); Jeff J. Rochow, Chagrin Falls, OH (US); Anne F. Poorman, Lyndhurst, OH (US)

(73) Assignee: ABB Inc., Norwalk, CT (US)

( * ) Notice: Subject to any disclaimer, the term of this patent is extended or adjusted under 35 U.S.C. 154(b) by 1018 days.

(21) Appl. No.: 09/904,285

(22) Filed: Jul. 12, 2001

(65) Prior Publication Data

US 2003/0014537 A1 Jan. 16, 2003

(51) Int. Cl.
*G06F 15/173* (2006.01)

(52) U.S. Cl. .................. 709/223; 709/203; 709/226; 709/238; 709/242; 701/100

(58) Field of Classification Search ........... 709/203, 709/226, 223, 225, 238, 242; 701/100
See application file for complete search history.

(56) References Cited

U.S. PATENT DOCUMENTS

| | | | |
|---|---|---|---|
| 5,265,207 A | 11/1993 | Zak et al. | |
| 5,406,557 A | 4/1995 | Baudoin | |
| 5,710,917 A | 1/1998 | Musa et al. | |
| 5,870,562 A | 2/1999 | Butman et al. | |
| 5,911,776 A | 6/1999 | Guck | |
| 5,991,806 A | 11/1999 | McHann, Jr. | |
| 6,101,182 A | 8/2000 | Sistanizadeh et al. | |
| 6,131,120 A | 10/2000 | Reid | |
| 6,226,675 B1 | 5/2001 | Meltzer et al. | |
| 6,314,469 B1 | 11/2001 | Tan et al. | |
| 6,446,133 B1 | 9/2002 | Tan et al. | |
| 2002/0029097 A1* | 3/2002 | Pionzio et al. | 700/286 |
| 2002/0103828 A1 | 8/2002 | Kupiec et al. | |
| 2002/0161826 A1* | 10/2002 | Arteaga et al. | 709/203 |
| 2002/0178214 A1* | 11/2002 | Brittenham et al. | 709/203 |
| 2002/0178244 A1* | 11/2002 | Brittenham et al. | 709/223 |
| 2003/0056004 A1 | 3/2003 | Argentieri et al. | |
| 2003/0208595 A1* | 11/2003 | Gouge et al. | 709/225 |
| 2005/0038708 A1* | 2/2005 | Wu | 705/26 |

FOREIGN PATENT DOCUMENTS

WO  WO 03/007175 A1  1/2003

OTHER PUBLICATIONS

Ralf Kramer et al., Thesaurus federations: loosely integrated thesauri for document retrieval in networks based on Internet technologies, Journal—Digital Libraries Springer-Verlag 1997, Karlsruhe, Germany.

* cited by examiner

*Primary Examiner*—Philip Tran
*Assistant Examiner*—Liang-che Alex Wang
(74) *Attorney, Agent, or Firm*—Michael M. Rickin; Paul R. Katterle (57) ABSTRACT

An asset management server for a network of an enterprise. The enterprise has one or more assets and two or more data sources and each source has a unique name for each asset. The server determines from an incoming message from the data sources about the assets which of the other data sources needs to receive the message and the unique name for the asset used by those sources. The server prepares the outgoing message to the sources.

13 Claims, 5 Drawing Sheets

METHOD AND APPARATUS FOR THE DELIVERY AND INTEGRATION OF AN ASSET MANAGEMENT SYSTEM INTO AN EXISTING ENTERPRISE NETWORK

FIELD OF THE INVENTION

This invention relates to enterprise networks that maintain data about the assets of the enterprise and more particularly to an asset management system that can be integrated with such networks.

DESCRIPTION OF THE PRIOR ART

Many business enterprises have multiple systems for maintaining information about an asset used in the business. For example the enterprise may have an accounting system, an inventory system, a maintenance system etc. each of which maintains information about an asset of the enterprise. Further each system may maintain its information about the asset under a name which is different than the name that another system in the enterprise uses for that asset.

In addition the enterprise may have many different clients, such as mobile, external and local clients, who need to obtain information about an asset from the other clients. For example, a local client may have information about an asset that is located at the site where the client is located which information should also be known by a system that is located at another location. The clients are connected to servers and at present the communications between clients and servers use a number of protocols and access methods depending on the type of network between the client and server. In addition, the data stream syntax and semantics are often platform dependent making interoperability difficult.

The difficulties arising from such a system can be illustrated by a simplified example of a valve that is part of a automation system used by an enterprise in the process or batch industries. The typical process or batch industry enterprise has many different departments such as engineering, operations, maintenance, documentation and accounting. Each of these departments has its own system for maintaining information about an asset and its own identifier for that asset. Thus the valve may be seen by the enterprise in many different contexts and by different names.

To the enterprise's process engineer the valve is known by a name in the process documentation which reflects the function of the valve. For example, if the enterprise is a process industry which make polymers as either an intermediate or final product and the valve is at the outlet of a polymer discharge tank, the valve may be identified in the process documentation as the polymer discharge valve. The valve is part of the control system at the enterprise and the operator in the control room typically refers to the valve by an alphanumeric designation which uniquely identifies the valve from other assets of the control system. The enterprise's maintenance department typically identifies an asset by its physical location to log service orders. Therefore, the maintenance department may identify the valve as V12-22-6.

The documentation department of the enterprise stores the service manuals for each asset. That department may identify the valve by the valve's manufactured part number. The enterprise's accounting department keeps track of the financial information for each capital asset. Typically each capital asset, such as the valve in this example, is identified by a unique identifier which includes the year of purchase. For the valve this identifier may for example be the asset number 97-23-579 where 97 is 1997 the year of purchase.

As can be appreciated each of these users have different needs for information about an enterprise asset. When these information sources need to interact the correlation of the resources must be done manually.

In addition to the problem of different data stores and applications the communication standards and software interfaces vary greatly between each of the data sources and enterprise locations. This makes data interchange difficult and seamless integration almost impossible.

The present invention allows an enterprise to easily add equipment to its network in the form of a web based name resolution, routing and display server which can be implemented on a single server computer that integrates the existing systems so that all clients of the enterprise network can interact with each other. The server of the present invention is transparent to the user of the enterprise network as the user does not have to know the name or location of the asset or its functionality.

The server of the present invention when added to the enterprise network:

a. resolves the asset name from the calling application in as many name spaces as are necessary;

b. routes the user's message to the appropriate destination asset data servers of the enterprise network with the name by which the asset is known by that server along with the associated parameters;

c. combines the responses from the destination asset data servers and returns them to the calling application by way of the same HTTP session used to send the message; and d. provides for display of the incoming message and response on the human systems interface (HSI) associated with the destination asset data servers and on the HSI associated with the calling application in operator windows and thus does not require another program or user interface for that display.

SUMMARY OF THE INVENTION

A method for allowing an enterprise to manage one or more assets of the enterprise, the enterprise having a network based data management infrastructure and two or more data sources each of which have a unique name for each of the one or more assets, the method comprising the step of:

adding to the enterprise network an asset management server, the server capable of performing the steps of:

(a) determining from an incoming message to the server from one of the two or more data sources about one of the one or more assets which of the others of the two or more data sources needs to receive the incoming message and the unique name used for the one or more assets by each of the other of the two or more data sources;

(b) preparing a message for each of the other two or more data sources that need to receive the incoming message, the prepared message using the unique name used for the one or more assets by each of the other of the two or more data sources; and (c) transmitting the prepared message to each of the other two or more data sources that need to receive the incoming message.

A method for allowing an enterprise to manage a plurality of assets of the enterprise, the enterprise having a network based data management infrastructure and a plurality of data sources each of which have a unique name for each of the plurality of assets, the method comprising the step of:

adding to the enterprise network an asset management server, the server capable of performing the steps of:

(a) determining from an incoming message to the server from at least one of the plurality of data sources about at least one of the plurality of assets which of the plurality of data sources needs to receive the incoming message and the unique name used for the at least one of the plurality of assets by each of the plurality of data sources that need to receive the incoming message;

(b) preparing a message for each of the plurality of data sources that need to receive the incoming message, the prepared message using the unique name used for the at least one of the plurality of assets by each of the plurality of data sources that need to receive the incoming message; and (c) transmitting the prepared message to each of the plurality of data sources that need to receive the incoming message.

An enterprise network for managing one or more assets of the enterprise comprising:

(a) two or more data sources each of which have a unique name for each of the one or more assets; and (b) an asset management server;

the server for:

(i) determining from an incoming message to the server from one of the two or more data sources about one of the one or more assets which of the others of the two or more data sources needs to receive the incoming message and the unique name used for the one or more assets by each of the other of the two or more data sources;

(ii) preparing a message for each of the other two or more data sources that need to receive the incoming message, the prepared message using the unique name used for the one or more assets by each of the other of the two or more data sources; and (iii) transmitting the prepared message to each of the other two or more data sources that need to receive the incoming message.

An enterprise network for managing a plurality of assets of the enterprise comprising;

(a) a plurality of data sources each of which have a unique name for each of the plurality of assets; and (b) an asset management server;

the server for:

(i) determining from an incoming message to the server from at least one of the plurality of data sources about at least one of the plurality of assets which of the plurality of data sources needs to receive the incoming message and the unique name used for the at least one of the plurality of assets by each of the plurality of data sources that need to receive the incoming message;

(ii) preparing a message for each of the plurality of data sources that need to receive the incoming message, the prepared message using the unique name used for the at least one of the plurality of assets by each of the plurality of data sources that need to receive the incoming message; and (iii) transmitting the prepared message to each of the plurality of data sources that need to receive the incoming message.

An asset management server for an enterprise having two or more clients and each of the two or more clients having a unique name for each of one or more assets of the enterprise comprising;

(a) means for determining from an incoming message to the server from one of the two or more data sources about one of the one or more assets which of the others of the two or more data sources needs to receive the incoming message and the unique name used for the one or more assets by each of the other of the two or more data sources;

(b) means for preparing a message for each of the other two or more data sources that need to receive the incoming message, the prepared message using the unique name used for the one or more assets by each of the other of the two or more data sources; and (c) means for transmitting the prepared message to each of the other two or more data sources that need to receive the incoming message.

An asset management server for an enterprise having a plurality of assets and a plurality of data sources each of which have a unique name for each of the plurality of assets comprising:

(a) means for determining from an incoming message to the server from at least one of the plurality of data sources about at least one of the plurality of assets which of the plurality of data sources needs to receive the incoming message and the unique name used for the at least one of the plurality of assets by each of the plurality of data sources that need to receive the incoming message;

(b) means for preparing a message for each of the plurality of data sources that need to receive the incoming message, the prepared message using the unique name used for the at least one of the plurality of assets by each of the plurality of data sources that need to receive the incoming message; and (c) means for transmitting the prepared message to each of the plurality of data sources that need to receive the incoming message.

An enterprise comprising:

(a) a plurality of assets;

(b) an enterprise network for managing the plurality of assets comprising:

a plurality of data sources each of which have a unique name for each of the plurality of assets; and an asset manager server, the server for:

(i) determining from an incoming message to the server from at least one of the plurality of data sources about at least one of the plurality of assets which of the plurality of data sources needs to receive the incoming message and the unique name used for the at least one of the plurality of assets by each of the plurality of data sources that need to receive the incoming message;

(ii) preparing a message for each of the plurality of data sources that need to receive the incoming message, the prepared message using the unique name used for the at least one of the plurality of assets by each of the plurality of data sources that need to receive the incoming message; and (iii) transmitting the prepared message to each of the plurality of data sources that need to receive the incoming message.

An enterprise comprising:
(a) one or more assets;
(b) an enterprise network for managing the one or more assets comprising:
two or more data sources each of which have a unique name for each of the one or more assets; and
an asset manager server, the server for:
(i) determining from an incoming message to the server from one of the two or more data sources about one of the one or more assets which of the others of the two or more data sources needs to receive the incoming message and the unique name used for the one or more assets by each of the other of the two or more data sources;
(ii) preparing a message for each of the other two or more data sources that need to receive the incoming message, the prepared message using the unique name used for the one or more assets by each of the other of the two or more data sources; and
(iii) transmitting the prepared message to each of the other two or more data sources that need to receive the incoming message.

DESCRIPTION OF THE PREFERRED EMBODIMENT(S)

Figure 1:
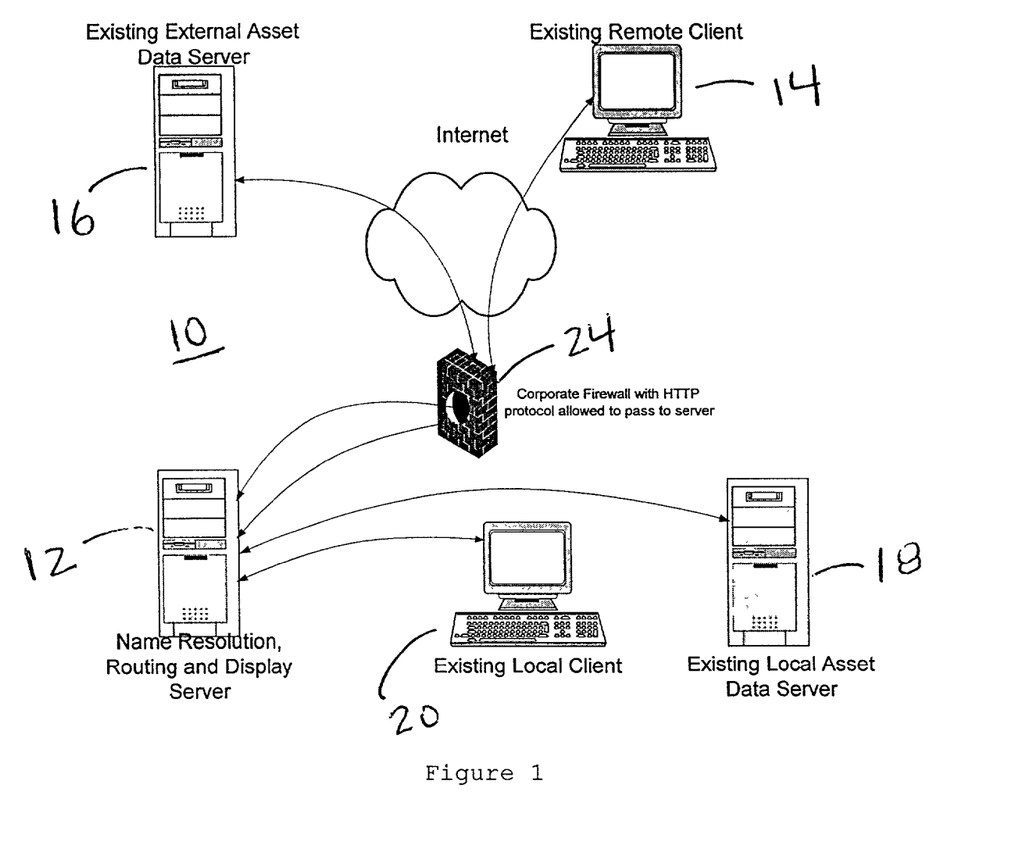
FIG. 1 shows a typical physical layout wherein the present invention is used.

Referring now to FIG. 1, there is shown a typical physical layout of an enterprise network 10 where the web based name resolution, routing and display server 12 of the present invention is used. Prior to the upgrading of network 10 by adding to the network the server 12, the existing enterprise network has remote clients such as mobile clients 14 that access either an existing external asset data server 16 or use dial-up networking to access through firewall 24 an existing local asset data server 18. In order for client 14 to fully participate in all applications of network 10 residing on existing local data server 18 and server 12 when that server is added to network 10, client 14 may as is well known to those of ordinary in the art have to access network 10 by way of a virtual private network.

The enterprise network 10 also has existing local clients 20 in the form of the traditional workstation shown in FIG. 1 or a handheld device which is not shown in FIG. 1. Prior to the upgrading of network 10 by adding to the network the server 12, the existing local clients 20 access the existing local asset data server 18. The existing external asset data server 16 can access the existing local asset data server 18 and vice versa.

In accordance with the present invention, the enterprise network 10 is upgraded by including therein the name resolution, routing and data display server 12. The existing remote client 14 and the existing external asset data server 16 both access server 12 through the firewall 24 of the enterprise network 10. The existing local clients 20 and the existing local asset data server 18 directly access server 12. Each data source such as clients 14 and 20 and servers 16 and 18 sends data relevant to an asset to the server 12 using a standard protocol such as HTTP in a standard format such as Extensible Markup Language (XML). The data includes the name by which the data source, that is the client and/or existing server, knows the assets.

Server 12 performs several functions. These functions are:
a. determining the aliases for the particular asset named in the incoming message;
b. preparing messages from the incoming message using those aliases;
c. including in the prepared messages the associated parameters;
d. transmitting the prepared message to those other servers and clients of the enterprise network that need to receive the incoming message; and
e. allowing the human machine interface to display information about the asset named in the incoming message in the form of a collection of asset oriented web pages.
Each of these functions are described below.

The operation of server 12 to resolve the asset name used by the client in as many other namespaces as possible is described in detail in detail below. That description is also in co-pending U.S. patent application Ser. No. 09/770,167 which was filed at the U.S. Patent and Trademark Office on Jan. 26, 2001 and is owned by an assignee related to the assignee of the present invention.

After resolving the asset name in as many other namespaces as possible, the server 12 returns the list of entities in the same format as the original request. This enables various other systems to easily exchange information about entities since each system only has to know the local entity name. It is the server 12 that resolves the correct foreign names.

The server 12 allows network interaction between two or more clients by using the XML over HTTP-Post protocol and thus server 12 behaves like a proxy server between the calling client and the destination clients. Server 12 keeps the HTTP session connected while forwarding the XML document to the destination clients in dedicated HTTP sessions.

This functionality of server 12 has the following benefits:
a. real time low latency non-transactional interaction among the clients which makes server 12 suitable for user interfaces and situations where fast response is required as for example in alarm notification systems;
b. simplicity as the originating message and subsequent response are exchanged by way of the same HTTP session thus avoiding the need of advanced message tracking and validation;
c. it is scalable to low end systems such as web browsers. Since such systems are not required to implement a message listener as required by the SOAP specification implemented by the Microsoft BizTalk server, web browsers can use the server 12 to initiate two way communication with destination clients such as web services;
d. off loading the calling client from knowing the destination client's interface details and location, that is, the calling client only has to know the address of server 12;
e. since server 12 behaves like a proxy server it reduces the points of entry of a confined network thereby simplifying network security management; and f. provides an Internet firewall friendly communication protocol thereby allowing the server 12 to be located outside of a firewall protected network and still provide two way communication if initiated within the firewall protected area.

Figure 2:
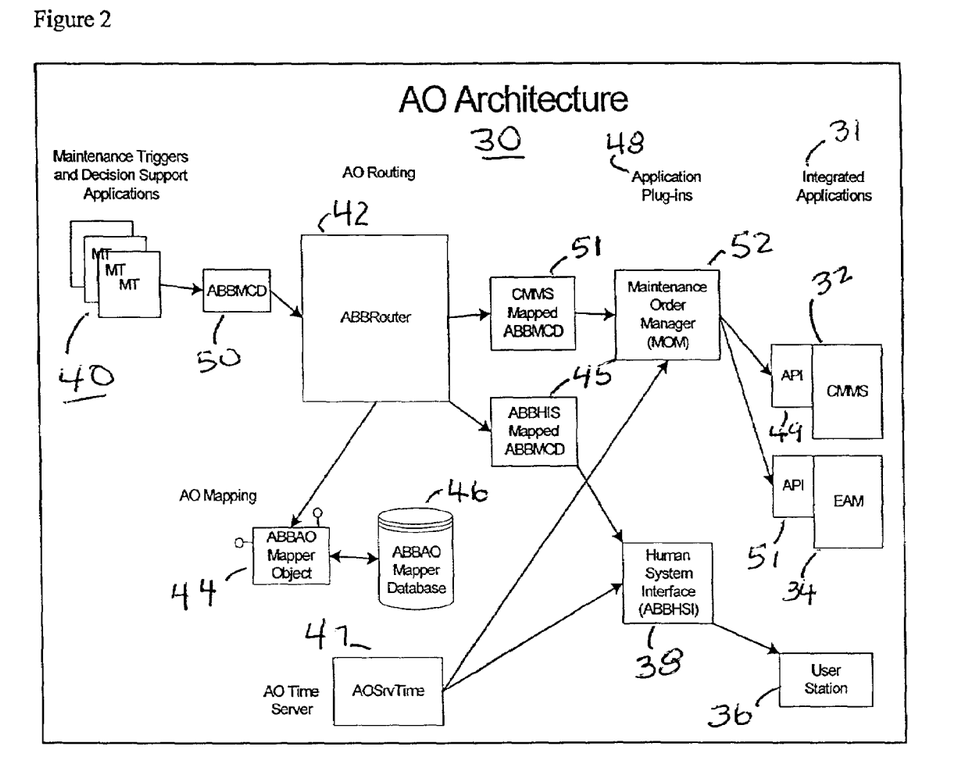
FIG. 2 shows an overview diagram of the architecture of which the present invention is a part.

The web based name resolution, routing and display server 12 of the present invention is part of an architecture 30 known as Asset Optimization (AO). An overview of the AO architecture 30 is shown in FIG. 2. AO architecture 30 is designed to allow asset monitoring and decision support applications to interact with a variety of third party integrated applications 31 such as the computerized maintenance management system (CMMS) 32 and the enterprise asset management (EAM) 34 applications shown in FIG. 2. AO architecture 30 is also designed to allow asset monitoring and decision support applications to interact with plant monitoring systems represented in FIG. 2 by consoles 36 and human system interfaces (HSI) 38 with the goal of giving the user a complete, easy to use and configure, system that optimizes the use of plant equipment and processes.

AO architecture 30 comprises four primary types of software:
1. Sources of maintenance condition information represented in FIG. 2 by maintenance triggers (MT) 20 or information queries,
2. AORouting 42, AOsrvTime 47, AOMapping 44 and 46,
3. Application plug-ins 48 and generic application interfaces 49, 51 to third party applications 32, 34, respectively,
4. Integrated third-party applications such as CMMS 32 and EAM 34.

The MTs 40 produce maintenance condition documents 50 which represent messages used in asset optimization (AO). The maintenance condition documents 50 are transformed using the configuration in the AOMapper 44, 46 and routed by AORouting 42 to a specific application plug-in interface. The transformed maintenance condition documents are designated as 45 and 51 in FIG. 2. One example of such an interface known as the Maintenance Order Manager (MOM) 52 is shown in FIG. 2. The MOM 52 takes a transformed maintenance condition document 51 and uses this message-oriented information to manage the event (message) in relation to a specific integrated CMMS 32 application.

The AO architecture 30 also has the ability to route transformed maintenance condition documents 45 to HSI 38. This allows the system to alert operators and managers of current or pending abnormal conditions and maintenance needs. The HSIs 38 supported by architecture 30 can include user stations 36 such as control consoles, wireless networked computers, hand-held organizers, pagers, e-mail and telephone alerts.

Figure 3:
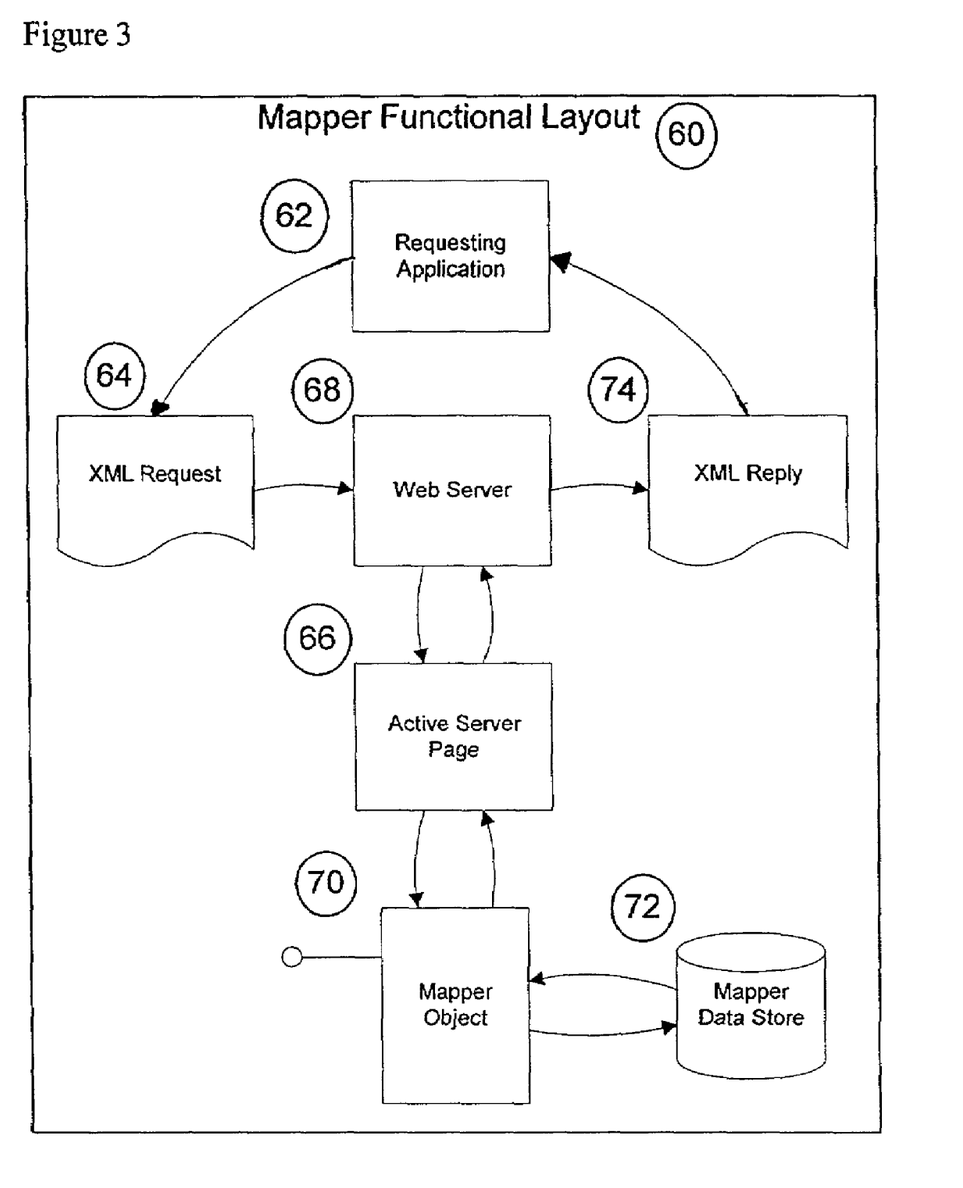
FIG. 3 shows the functional layout of the components of the web based mapper software that is part of the present invention.

FIG. 3 shows the functional layout 60 of the components of the web based mapper software that is part of server 12 and the data flow between these components. Some of the components shown in FIG. 3 are executed in server 12. The requests for relationships, that is, determining the alias names by which a given entity is known by other systems of the enterprise, in the software of the present invention are initiated by a software component 62 that needs the alias name(s) for a given entity. Component 62 can be a web page or a client application located on a remote system or a service component of the AO architecture 30.

The request is formatted as an XML document 64 and sent to the mapper interface active server page (ASP) 66 through the Web Server 68 which executes on server 12 using the Post command of the HTTP protocol. The ASP 66 then instantiates the mapper interface object 70 that interprets the requested XML document. The object 70 then queries the mapper data store 72 for all related alias names. As those of ordinary skill in the art can appreciate, object 70 can be embodied as a data dictionary allowing one to many and many to many relationships.

All of the related alias names are then formatted into a new XML document 74 that is returned by the ASP 66 through the Web Server 68 using the Response method of the HTTP protocol. The reply is then sent to the requesting application 62 over the same connection, session and protocol as the original request.

Server 12 includes router software whose function is described below in connection with FIG. 4. A client such as for example remote client 14 of FIG. 1 transmits to server 12 as an XML document data relevant to an enterprise asset. As was described above, server 12 determines the aliases for the particular asset named in the incoming message from the sending client in as many namespaces as possible and prepares messages from the incoming message from the sending client using those aliases. Server 12 then transmits the prepared message to those other servers and clients of the enterprise network that need to receive the incoming message. The server 12 then combines any XML message responses from the other servers and clients and returns them to the originally sending client by way of the same HTTP session that the client used to send the message. It is the router software that receives the message from the originally sending client and combines the responses and returns them to that client during the same HTTP session that the originally sending client used to send the message to server 12.

Figure 4:
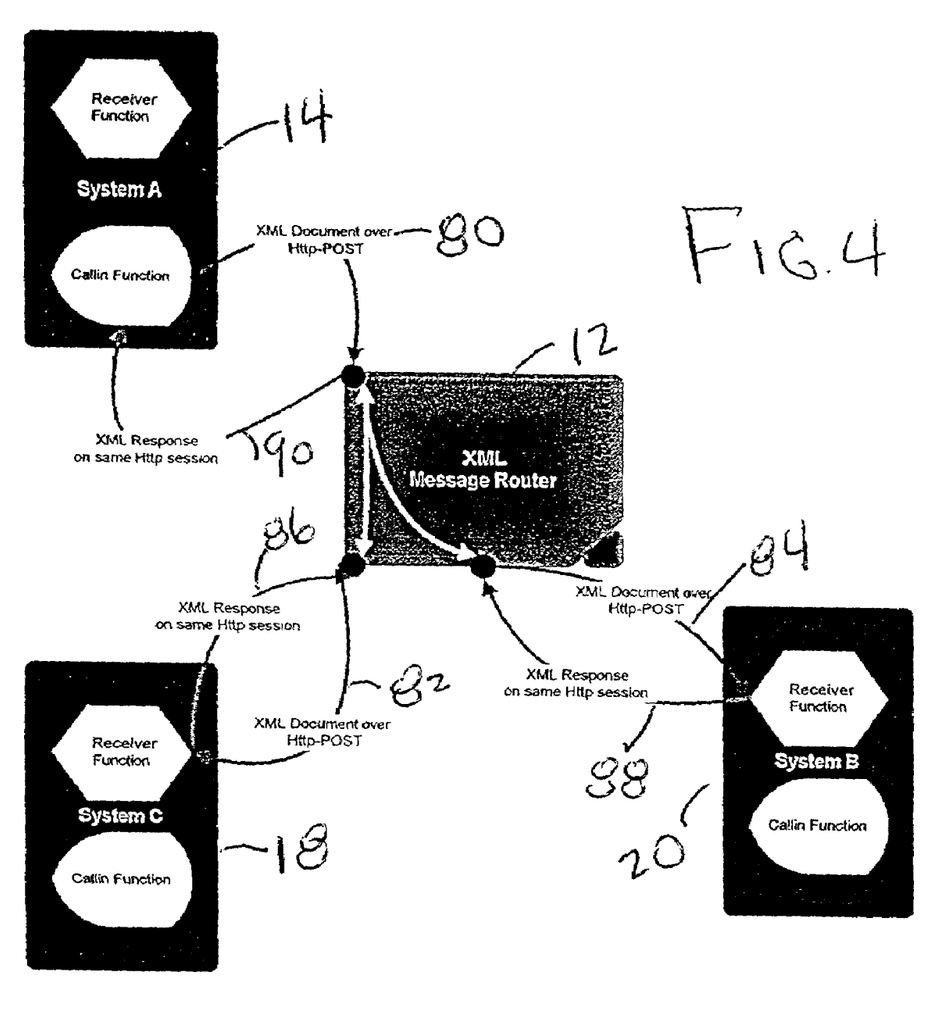
FIG. 4 shows the function performed by the router software that is part of the present invention.

FIG. 4 shows the function performed by the router software that is part of the present invention. A client such as remote client 14 of FIG. 1 transmits a message indicated by 80 to server 12. The server 12 after resolving that message in as many namespaces as are applicable transmits the prepared message to, for example, the existing local asset server 18 and existing local client 20 of FIG. 1 as indicated by 82 and 84. In the same HTTP session used by remote client 14 to send the message to server 12, the server 18 and local client 20 respond to the messages 82 and 84 as indicated by 86 and 88. The server 12 then combines the responses from the recipients and transmits the combined response indicated by 90 to the remote client 14.

Figure 5:
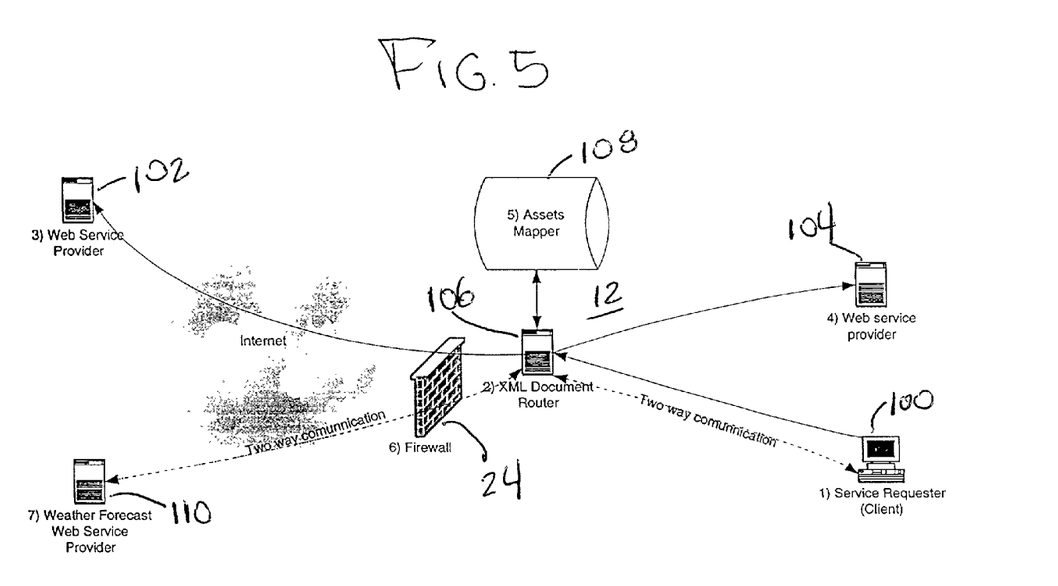
FIG. 5 shows illustrates in another form two examples of the function performed by the router software.

FIG. 5 illustrates in another form two examples of the function performed by the routing software of server 12. In the first example a client application 100, which could be local client 14 of FIG. 1, detects a faulty condition of one of the monitored assets. The client asset may for example be a vibration monitoring system and the enterprise may be an electric power generating enterprise and thus the asset monitored by the system may be a turbine. It can be appreciated that other servers and client applications in the enterprise, such as web server providers 102 and 104, should be notified immediately of the asset fault condition that is detected by client application 100.

To provide that notification, client application 100 upon detection of the fault condition immediately sends an XML document describing the condition to server 12. Server 12 includes router 106 and mapper 108. The server 12 upon receipt of the XML document from client application 100, determines the other clients and servers of the enterprise that need to know the information about the faulty asset. The router 106 uses the document content, for example, the asset identification, and the document type, for example, the document is a maintenance condition document, to determine which of the other clients and servers is to receive the XML document that server 12 has received from client application 100.

The router 106 based on the destination type transforms the XML document with the additional data found in mapper 108 before forwarding the document to the destination server(s) and client(s). The mapper 108 contains the configuration and data used by the router 106 to map the incoming XML message/asset identification to the destination server(s) and client(s). As is shown in FIG. 5, the destination web server provider 102 can reside outside of firewall 24 since the communication protocol is XML over HTTP and all of the HTTP sessions are initiated within the firewall 24.

In the second example of FIG. 5, the client application 100 needs to contact a service that provides certain information such as for example the weather forecast. The weather forecast web server 110 is one of the external service providers of the enterprise. The application 100 sends a XML document to server 12 requesting the weather forecast for a particular day and location. It should be appreciated that the application 100 does not have to know where and how to reach the server 110. The server 12 performs that role using the functionality in the router 106 and mapper 108.

Upon receipt of the XML document from client application 100 the server 12 determines the first weather forecast server that is available. The router 106 uses the received XML document content, for example, the geographical region, and the document type, for example, the document is a weather forecast document, to determine which of the other clients and servers is to receive the incoming XML document.

The router 106 based on the destination type transforms the XML document with the additional data found in mapper 108 before forwarding the document to the destination server 110. The mapper 108 contains the configuration and data used by the router 106 to map the incoming XML message/asset identification to the destination server(s) and client(s). The destination server 110 receives the transformed XML document from server 12 and returns a response in the same HTTP session where the request from client application 100 was made. The server 12 then returns the response back to application 100. As is shown in FIG. 5, the destination web server provider 110 can reside outside of firewall 24 since the communication protocol is XML over HTTP and all of the HTTP sessions are initiated within the firewall 24.

It is to be understood that the description of the preferred embodiment(s) is (are) intended to be only illustrative, rather than exhaustive, of the present invention. Those of ordinary skill will be able to make certain additions, deletions, and/or modifications to the embodiments) of the disclosed subject matter without departing from the spirit of the invention or its scope, as defined by the appended claims.

What is claimed is:

1. A method of managing a plurality of physical assets of an industrial enterprise, the assets including a first asset, said method comprising the steps of:
   (a.) providing a network based data management infrastructure with a plurality of data sources each of which have a unique name for each of said assets, said network based data management infrastructure including an asset management server, and said data sources including a monitoring system for monitoring an operating characteristic of the first asset; and
   (b.) operating said asset management server to:
      receive a first message from the monitoring system, said first message containing information about said operating characteristic of the first asset;
      determine from said first message that other data sources need to receive said information;
      determine said unique name used for said first asset by each of said other data sources that need to receive said information;
      prepare a second message based on said first message for each of said other data sources that need to receive said information, wherein said second messages contain said information and are respectively prepared using said unique names for said first asset that are used by said other data sources that need to receive said information; and
      transmit said second messages to said other data sources that need to receive said information, respectively; and
   (c.) displaying said information on a human machine interface associated with one of said other data sources that need to receive said information.

2. The method of claim 1, wherein said first asset is a turbine and said monitoring system is a vibration monitoring system.

3. The method of claim 1, wherein the first message is a maintenance condition document.

4. The method of claim 1, further comprising transmitting said first message using the HTTP protocol.

5. The method of claim 4, wherein said first message and each of said second messages is in the XML format.

6. The method of claim 1, further comprising transmitting said first message in a protocol session; and
   wherein each of said second messages is transmitted to each of said other data sources during said protocol session that transmitted said first message.

7. An enterprise network for managing a plurality of physical assets of an industrial enterprise including a first asset, said enterprise network comprising:
   (a.) a first data source and plurality of other data sources, each of which have a unique name for each of said assets, the first data source being a monitoring system for monitoring an operating characteristic of the first asset;
   (b.) an asset management server connected to said first data source and said other data sources, said asset management server being operable to:
      receive a first message from said first data source, said first message containing information about said operating characteristic of said first asset;
      determine from said first message that said other data sources need to receive said information;
      determine said unique name used for said first asset by each of said other data sources that need to receive said information;
      prepare a second message based on said first message for each of said other data sources that need to receive said information, wherein said second messages contain said information and are respectively prepared using said unique names for said first asset that are used by said other data sources that need to receive said first message; and transmit said second messages to said other data sources that need to receive said information, respectively; and (c.) a human machine interface associated with one of said other data sources that need to receive said information, said human machine interface being operable to display said information.

8. The enterprise network of claim 7, wherein said first asset is a turbine and said monitoring system is a vibration monitoring system.

9. The enterprise network of claim 7, wherein said first message is a maintenance condition document.

10. The enterprise network of claim 7, wherein said first message is transmitted using the HTTP protocol.

11. The enterprise network of claim 10, wherein said first message and each of said second messages is in the XML format.

12. The enterprise network of claim 7, wherein said first message is transmitted in a protocol session; and wherein said asset management server is operable to transmit each of said second messages to each of said other data sources during said protocol session that transmitted said first message.

13. The enterprise network of claim 7, wherein the industrial enterprise is an electric power generating station.

* * * * *